United States Patent
Berger et al.

(10) Patent No.: US 10,926,961 B2
(45) Date of Patent: Feb. 23, 2021

(54) MULTILINE TRANSFER OF PRODUCT

(71) Applicant: SIDEL ENGINEERING & CONVEYING SOLUTIONS, Reichstett (FR)

(72) Inventors: Julien Berger, Reichstett (FR); Zmaj Petrovic, Reichstett (FR)

(73) Assignee: SIDEL ENGINEERING & CONVEYING SOLUTIONS, Reichstett (FR)

( * ) Notice: Subject to any disclaimer, the term of this patent is extended or adjusted under 35 U.S.C. 154(b) by 0 days.

(21) Appl. No.: 16/604,989

(22) PCT Filed: Apr. 11, 2018

(86) PCT No.: PCT/FR2018/050912
§ 371 (c)(1),
(2) Date: Oct. 11, 2019

(87) PCT Pub. No.: WO2018/189485
PCT Pub. Date: Oct. 18, 2018

(65) Prior Publication Data
US 2020/0156882 A1    May 21, 2020

(30) Foreign Application Priority Data
Apr. 11, 2017 (FR) .................................. 1753137
Jun. 7, 2017 (FR) .................................. 1755064

(51) Int. Cl.
*B65G 47/04* (2006.01)
*B65G 47/08* (2006.01)
(Continued)

(52) U.S. Cl.
CPC ......... *B65G 47/088* (2013.01); *B65G 47/082* (2013.01); *B65B 21/06* (2013.01);
(Continued)

(58) Field of Classification Search
CPC ........................... B65G 47/088; B65G 47/082
(Continued)

(56) References Cited

U.S. PATENT DOCUMENTS 2,731,130 A * 1/1956 Blickenderfer, Jr. ... B27B 5/228
                                                            198/459.5
4,730,718 A * 3/1988 Fazio ..................... B65G 47/54
                                                            198/370.1
(Continued)

FOREIGN PATENT DOCUMENTS

EP      0613838 A1    9/1994
EP      2810878 A1   12/2014
(Continued)

OTHER PUBLICATIONS

International Search Report dated Jun. 8, 2018 for PCT/FR2018/050912.

*Primary Examiner* — Douglas A Hess (57) ABSTRACT

The present invention relates to a conveyor device, comprising a surface for receiving products that is longitudinally wound around drive means in the form of at least one first drive roller and around at least one return roller, characterized in that said receiving surface comprises a first independent section and a second independent section, said first section extending along a first part of the length of said surface, by winding around said first drive roller and around said return roller, said second section extending along a second part of the length of said surface, distinct from said first part, by winding around a second drive roller. The invention further relates to a dedicated method for conveying products, where the advancing speeds of the sections are controlled independently of each other.

13 Claims, 3 Drawing Sheets

(51) Int. Cl.
  *B65B 21/06* (2006.01)
  *B65B 35/44* (2006.01)
  *B65G 47/26* (2006.01)

(52) U.S. Cl.
  CPC ............ *B65B 35/44* (2013.01); *B65G 47/266* (2013.01); *B65G 47/268* (2013.01); *B65G 2201/0244* (2013.01); *B65G 2207/14* (2013.01)

(58) Field of Classification Search
  USPC ......... 198/419.2, 419.3, 459.8, 461.1, 461.2, 198/604, 606, 608
  See application file for complete search history.

(56) References Cited

U.S. PATENT DOCUMENTS

| | | | | |
|---|---|---|---|---|
| 4,768,642 | A * | 9/1988 | Hunter | B65G 47/082 198/419.2 |
| 5,004,094 | A * | 4/1991 | Brandt | B65G 43/08 198/460.1 |
| 7,588,139 | B1 * | 9/2009 | Campbell, III | B65G 15/105 198/407 |
| 7,588,239 | B2 * | 9/2009 | Marcinik | B65H 31/40 198/412 |
| 7,942,398 | B1 * | 5/2011 | Marcinik | B43M 3/04 198/626.5 |
| 10,259,663 | B2 * | 4/2019 | Heuft | B65G 21/10 |

FOREIGN PATENT DOCUMENTS

| | | |
|---|---|---|
| KR | 20090005792 U | 6/2009 |
| WO | 2007115085 A1 | 10/2007 |
| WO | 2012117008 A1 | 9/2012 |

\* cited by examiner

MULTILINE TRANSFER OF PRODUCT

The present invention lies in the field of handling and conveying products.

Such products may be containers of large or small bottle or can type.

The invention more particularly concerns a product conveyor device and a product conveying method.

In known manner, products are generally fed from one point to another along a production and/or packaging line by means of conveyor belt devices that transport said products on their own, singly, in bulk, in batches or otherwise from one zone to another through various modules in which said products are treated.

To this end, a conveyor device of this kind includes a surface receiving said products that is generally in the form of an endless belt wound at one longitudinal end of said device around a motorized drive roller and at the opposite end around a return roller. The speed of movement of the belt is therefore controlled by the rotation speed of said drive roller.

At the present time a conveying problem exists in the continuous supply of products to a module situated downstream of said conveyor by moving said products from a loading zone or other upstream module where the products accumulate and are transferred cyclically in groups from said zone or said upstream module onto the receiving surface of said conveyor. The invention concerns this kind of transfer of products that is always effected essentially transversely relative to the direction of forward movement of said conveyor, in other words in a direction that is orthogonal or substantially orthogonal to it, from said loading zone or said upstream module to the receiving surface. In other words, the products of the transferred group are fed onto the belt of the conveyor by crossing at least one lateral edge of said conveyor.

In particular, this transfer of a group of products must preferably be effected without modifying their order, which is preferably that of a matrix with no quincunx. In other words, the arrangement of the products must be preserved at the time of their transfer from the storage zone or the upstream module onto said conveyor in the form of a group extending in the form of a longitudinal segment in the direction of forward movement of the conveyor, or even a plurality of such segments alongside one another, in a direction transverse to the forward movement of the conveyor.

There is therefore a constraint in the continuous supply of the downstream module at a nominal speed and therefore a throughput that depends on the module in question, whilst the conveyor is loaded in a discontinuous manner, in particular in each cycle with a group of products that extends longitudinally over the entire length of the loading zone in the form of a plurality of parallel longitudinal segments distributed transversely, at the speed of forward movement of the conveyor.

For example, a group of products transferred simultaneously may consist in a grouping in accordance with a matrix often of square or rectangular parallelepiped shape. Transferring this group whilst preserving its disposition and with no risk of the products falling over requires a time during which the speed of said conveyor must be reduced, or even stopped, in order to prevent any change in the disposition of the products within the transferred group, which might be induced by friction on the products, in particular on their base in bottom contact, at the moment of passage from the surface of the loading zone or said upstream module to the receiving surface of the belt of the conveyor. This time for which the conveyor is driven at a reduced speed, or is even immobile, impacts the feeding of the downstream module, which must remain continuous if production is not to be interrupted.

A widely deployed solution consists in separating the device into at least two successive conveyors driven at different speeds. A first or upstream conveyor is situated at the exit from the loading zone or the upstream module and is driven at a lower speed. This momentarily very low speed enables transfer of the products with minimum risk of changing position or even of falling over. A second conveyor is situated downstream, at the exit from said first conveyor and feeds the downstream module at a constant speed. Moreover, in order to ensure continuous feeding said first conveyor extends over a length enabling the simultaneous movement of a plurality of groups of products. Although driven at a lower speed, it therefore enables feeding of a required quantity of products to the second conveyor whilst preserving said continuity of supply.

There nevertheless exists a disadvantage at the level of the junction between said first and second conveyors, forming a globally triangular hollow with rounded convex edges because of being wound around their respective roller, with a gap at the level of the bottom point. This hollow can lead to jamming the bottom part of a product and changing its position, breaking the required order of the matrix. Even by reducing the diameter of the rollers in order to reduce the curvature and the gap, it is not possible to fill this hollow completely, which destabilizes the products, sometimes to the point of them falling over.

One solution consists in covering the hollow by means of a dead plate over and along which said products will slide during their passage from the first conveyor to the second. However, the products are moved over this plate only by being pushed by other products conveyed by the first conveyor. This again results in possible modification of the disposition of the batch of products, or even in said products possibly falling over. Moreover, pushing products, often for example globally cylindrical flexible plastic material bottles, in contact with one another can cause them to be deformed by compression, in particular because of their shape and the elasticity of the material constituting them. Moreover, the passage over a dead plate remains a source of instability incompatible with high throughputs.

There is therefore a real need to apply a solution to the existing mechanisms firstly enabling the indispensable continuous feeding of a downstream module whilst secondly enabling preservation of the positioning as an ordered matrix of the products forming the group during its transfer from a loading zone or an upstream module to said downstream module.

An object of the invention is to alleviate the disadvantages of the prior art by proposing a conveyor device in which the product receiving surface is formed by at least two independent sections, so that their respective drive speeds can be controlled independently of one another, the two sections being in line with one another and mobile relative to one another. Moreover, the speeds are variable in order at least to enable firstly stopping a first section for the time to load the products into it from the loading zone or the upstream module while the other section continues to advance along said device at the nominal speed of feeding the downstream module and secondly progressive acceleration of said first section before stopping it to achieve a speed greater than that of said other section until it rejoins it, returning to a speed equivalent to the nominal speed of feeding the downstream module, thus ensuring the continuous feeding of products.

In a similar manner, once the products carried by the other section have all been delivered to the downstream module, said other section is accelerated in order to return to the loading position situated at the level of said loading zone or the upstream module whilst the first section retains its speed of feeding products at the level of the downstream module.

To this end, a conveyor device of this kind has for feeding the downstream module a belt separated into at least independent two sections in line with one another, each section being mounted on and fastened to autonomous drive means. The two sections circulate on the same closed path, convey the products over the same travel and circulate over the same return travel. They intervene turn and turn about and their spacing can change to provide respective different speeds, associated in particular with receiving products and with offloading products.

The endless nature of the path of each section is for example provided by means of drive means extending internally between a drive roller and a return roller constituting said drive means, enabling each section to feed in a closed loop all along the circuit constituted by said conveyor. Other closed loop movement technologies may be envisaged.

The invention consists in a conveyor device, including a surface to receive products extending at least in part longitudinally along a closed loop path, characterized in that:
 said receiving surface includes at least one first section and one second section that are independent;
 said first section extending over a first part of the length of said surface, driven via first drive means;
 said second section extending over a second part of the length of said surface distinct from said first part, driven via second drive means.

According to other additional possible nonlimiting features:
 said first drive means may take the form of at least one first drive roller and at least one return roller, said first section including at a first end first winding means at least around said first drive roller and at a second end first winding means at least around said return roller.
 said second drive means may include at least one second drive roller, said second section including second winding means at the level of one of its ends at least around said second drive roller.
 said second winding means of said second section may be mounted on and wound around said return roller of the first drive means.
 said first and second winding means may take the form of at least one belt reciprocally engaged with said first drive roller and said second drive roller, each belt being fastened to the inside of a respective one of the sections.

The invention also concerns a method of conveying products. A method of this kind specifically provides for momentarily stopping or almost stopping a first section of a conveyor device according to the invention while the other section is moving and then accelerating this first section up to a speed enabling it to rejoin said other section, namely to abut the downstream end of the first section with the upstream end of said other section, while the latter is feeding the downstream module with products.

To be more precise, said method, in which said products are disposed in ordered positions, consists in conveying said products from a loading zone or an upstream module to a downstream module via a receiving surface.

The invention therefore also consists in a method of conveying products in which said products are arranged in an ordered position, consisting in:
 conveying said products from a loading zone or an upstream module to a downstream module across a receiving surface;
 characterized in that:
 the receiving surface includes a first section and a second section driven independently;
 said first section is stopped at the level of said loading zone or of the upstream module and said products are transferred from said loading zone or said upstream module whilst said second section is driven at a given speed and offloads the products at the level of said downstream module;
 said first section is accelerated to a speed higher than said given speed of said second section until the downstream end of said first section reaches the upstream end of said second section.

In other words:
 said receiving surface may include a first section and a second section driven independently and in succession in the longitudinal direction of forward movement;
 said first section may be stopped at the level of said loading zone or of the upstream module and said products transferred transversely relative to the forward movement of the sections from said loading zone or said upstream module whilst said second section feeds the downstream module with products and to this end moves at another speed, which preferably depends on the latter;
 once loaded, said first section may be accelerated until the downstream end of said first section rejoins the upstream end of said second section;
 once the products from the second section have all been fed, the downstream module may be fed with the products from the first section, which follows on from the second, and so on.

According to other additional possible nonlimiting features:
 when the second section reaches the first said first section is decelerated to said speed of said second section.
 it may include a step of feeding the downstream module by the continuous and successive arrival of the sections.
 after the products are off loaded at said downstream module by said second section, the second section may be driven at high speed at least along the return run as far as said loading zone or the upstream module and said second section is then stopped.
 it may transversely transfer a group of products from said loading zone to one of said sections, said group having at least one or even at least two longitudinal segments each including a plurality of products, and where applicable then causing the products to circulate in separate longitudinal corridors delimited by walls.

A single device with a dedicated conveying method now enables a plurality of successive conveyors to be replaced, limiting the cost, footprint and infrastructure of the production and/or packaging line.

In accordance with this method, each section in succession receives products at a very low speed or even when stationary, disengages, feeds products at speed set by the module fed with products, and returns. The sections execute their cycles at the same time and at any given time each is at a different stage.

The present invention will find a preferred but in no way limiting application in the conveying of products ordered in accordance with a square or rectangular parallelepipedal matrix with no quincunx.

The transferred group taking the form of a plurality of side by side longitudinal segments, said transfer is preferably effected with a pusher plate for each segment, or even a pair of plates between which the segment extends, which is made possible by the absence of any quincunx. The plates can therefore all be mounted on the same tool, one after the other in the direction in which the corresponding segments accumulate, and contribute to preventing the appearance of a quincunx.

The invention could moreover be incorporated into a production line extending from a product loading zone, in particular dedicated to accumulation of said products already ordered or within which said products are ordered, to a downstream module the entry of which receives said products in at least one but preferably a plurality of introduction corridors within said downstream module. Moreover, the latter may advantageously be a load-forming type module adapted to effect a step of forming the batches of products into loads. It may be a boxing machine, a palletting machine, etc.

Other features and advantages of the invention will emerge from the following detailed description of nonlimiting embodiments of the invention given with reference to the appended figures in which.

The present invention firstly concerns a device 1 for conveying products 2.

A device 1 of this kind is integrated into a production and/or packaging line of said products 2. It more particularly transports the products by moving them between two locations of said line, from a loading zone 3 or an upstream module to a downstream module 4. According to the preferred embodiment, represented in the figures, the conveyor 1 extends longitudinally from a point adjacent to said loading zone 3 to be discharged in the form of a plurality of distinct corridors at the entry of a downstream module 4, where the latter can in particular be of the load-forming type.

It will be noted that the conveyor device 1 according to the invention is positioned relative to said loading zone 3 or the upstream module so that the products 2 are reciprocally transferred transversely from one to the other.

The conveyor 1 therefore advances in a longitudinal direction. The products 2 are fed in the form of a group 5 onto the surface of said conveyor 1 with a horizontal and therefore transverse perpendicular movement from the loading zone 3, which may in particular be mobile transversely to feed new products 2 continuously as close as possible to the conveyor 1.

As stated above, said products 2 constitute a group 5 and may thereafter be regrouped in batches in order to form them into loads, for example.

A group 5 of this kind extends so as to transfer one or more lines of products to the conveyor 1 at the same time. Moreover, the load-forming downstream module 4 enables the products 2 to be received in order to film-wrap them in batches and retain them, by way of a load-forming operation, transforming batches into loads during this operation. This feeding must be effected at a nominal speed dependent on the throughput of the downstream load-forming module without causing any rupture or gap between the products fed by said conveyor 1. To this end, the conveyor 1 therefore transports the products 2, organized as a matrix with no quincunx, as far as an entry 40 of said downstream module 4. At this level the latter includes a transporter 41 for moving the products with a view to treating them and feeding them to the remainder of the production and/or packaging line. A group 5 of products 2 preferably extends longitudinally from one side to the other of the loading zone, and also transversely over one or two, or even more, lines of products 2.

It is possible to use a cycling/pushing means to perform the transfer from the loading zone 3 to the conveyor 1.

Figures 1, 2:
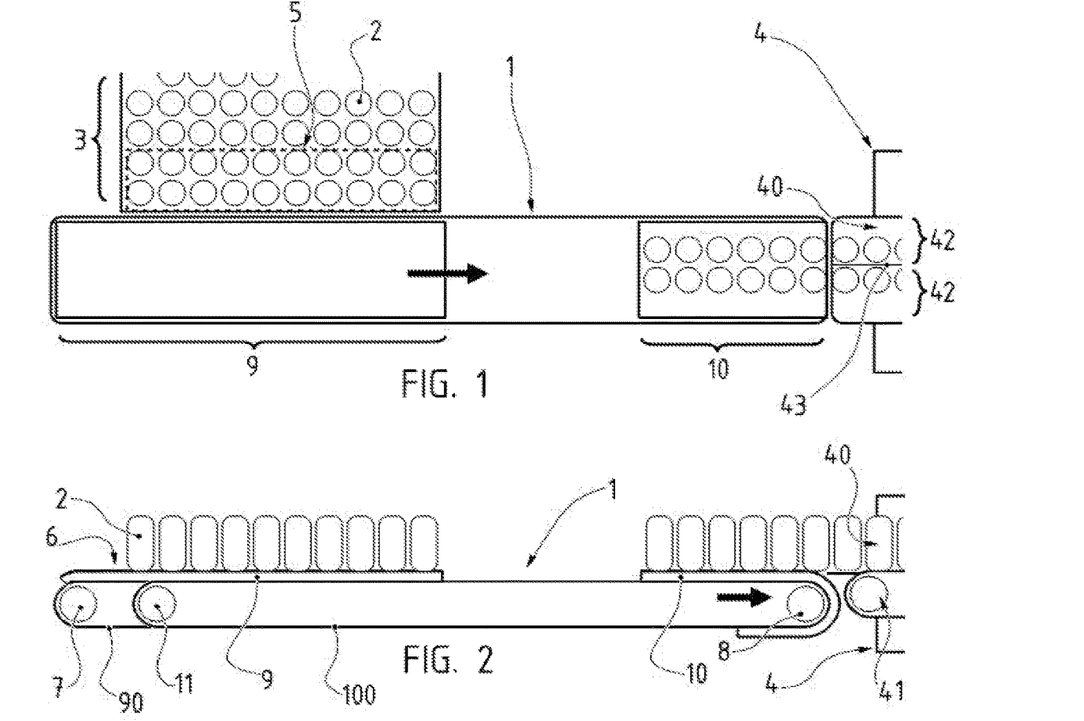
FIG. 1 represents diagrammatically a view from above of one embodiment of the invention in a production line, more particularly showing the two separate sections of the product receiving surface at the level of a conveyor device.
FIG. 2 represents diagrammatically a side view of FIG. 1, showing a first step with the first section stopped at the level of a loading zone and the second section being offloaded at the level of a downstream module.

Moreover, according to the example seen in FIG. 1, the downstream module 4 receives the products and guides them into two corridors 42 separated by a guide rail 43. This number of corridors 42 depends on the size of the matrix of the batch of products 2, each corridor 42 being separated from an adjacent other corridor by means of a rail 43 or a wall.

In order to move the products 2 the conveyor device 1 includes a surface 6 to receive said products 2. This surface 6 generally receives the products 2 with their lower face, namely their bottom, resting on it. Guide means, not shown, may be disposed at the sides in order to channel said products during movement of said conveyor 1.

It will be noted that the width of the receiving surface 6 may be sized as a function of the size and the number of products 2 to be received. In particular, once disposed on this surface 6 a group 5 of products 2 may occupy all the width of said receiving surface 6.

Generally speaking, the transfer of the products 2 from the loading zone 3 to the receiving surface 6 is effected simultaneously by horizontally and transversely sweeping a plurality of products 2 that forms at least one complete longitudinal segment in the loading zone 3, preferably a plurality thereof. This at least one segment extends over the loading zone 3 in the longitudinal direction of forward movement of the conveyor device 1 from the most upstream product 2 to the most downstream product 2.

As stated, the products are transferred by pushing them transversely, preferably by means of a surface that extends longitudinally. Its length in the direction of movement of the conveyor therefore defines the number of products present in the loading zone 3 in the longitudinal direction. On transferring the products from the loading zone 3 to the receiving surface 6, the entirety of at least one longitudinal section is moved simultaneously. The section 9, 10 that receives the products preferably has a longitudinal dimension very similar to that of the at least one segment that it receives. In other words, the longitudinal dimension of each section 9, 10 essentially corresponds to the longitudinal dimension of the tool that feeds the products thereto, that dimension also possibly corresponding essentially to the longitudinal dimension of the loading zone 3, or even that of a tool further upstream that initially fed the loading zone 3 with products by pushing them transversely.

Said receiving surface 6 extends at least in part longitudinally, traveling for example in a loop around at a first end drive means in the form of at least one first drive roller 7 and at a second end at least one return roller 8. Actuating rotation of said first roller 7 therefore drives the receiving surface 6 and movement of the products 2. The direction of movement of this surface 6 is modelled by an arrow in FIG. 1 without the size of that arrow implying any speed relationship.

The conveyor device 1 is advantageously characterized in that said receiving surface includes at least one first section 9 and one second section 10 that are independent and in line with one another in their direction of forward movement. The receiving surface 6 is therefore divided into at least two portions longitudinally, i.e. in the direction of driving and of circulation of the products that the conveyor 1 is transporting. In other words, the sections 9 and 10 may be controlled separately, in particular with regard to driving them and therefore their speed of forward movement. The longitudinal dimension as much of the first section 9 as of the second section 10 preferably essentially corresponds to the longitudinal dimension of the transferred group 5, which generally corresponds to the longitudinal dimension of the loading zone 3.

It will be noted that the device 1 may include supplementary sections subdividing the receiving surface 6, said supplementary sections being independent of or slaved to one or the other of the first and second sections 9 and 10.

Each section 9, 10 may consist of a belt of finite length, in particular made of an appropriate material, such as a plastic compound. The section possibly has elastic characteristics allowing in particular local compression thereof. Accordingly, when the sections 9, 10 are butted up the compressed junction between the belts ensures a connection with no hollow and no gap.

The sections 9, 10 are preferably the same length. Moreover, this length corresponds to the dimension of the portion transferring the products 2 from the loading zone 3 or the upstream module 4, i.e. is preferably equal to the dimension of that portion. This ensures that the entirety of a segment of products 2 present in said zone 3 can be transferred to the facing section 9, 10 without creating a significant gap between the most upstream products on the downstream section 9, 10 and the most downstream products on the upstream section 10, 9.

Moreover, said second section 10 extends along a second part of the length of said surface 6 distinct from said first part 9 and supported by second winding means 100 at least around a second drive roller 11. Said sections 9, 10 then extend one behind the other, in succession with a variable gap between them that is controlled as a function of their respective positions.

As can be seen in the embodiment represented in FIGS. 2 to 5, the drive rollers 7, 11 of each section 9, 10 may be disposed in the same horizontal plane, preferably spaced from one another. One of the sections 9 then circulates in a loop of greater length than that of the other section 10 because its drive roller 7 is offset relative to the other drive roller 11. The speeds of movement of this section 9 with a more distant drive roller 7 are therefore adapted. The sections 9, 10 have specific drive configurations relative to one another, in speed as much as in acceleration and deceleration.

Figure 6:
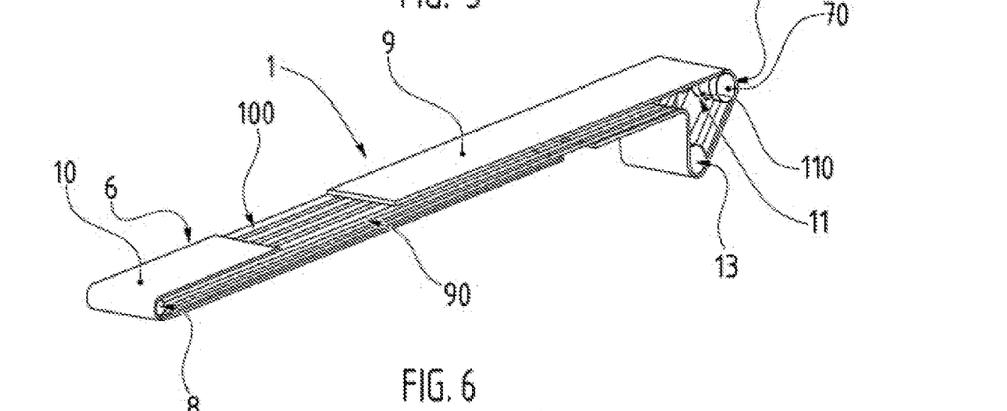
FIG. 6 represents diagrammatically a three-quarters perspective view of a conveyor device in accordance with one embodiment of the invention in a first position of movement of the first and second sections, showing overall the driving of the first and second sections via separate belts.
Figure 7:
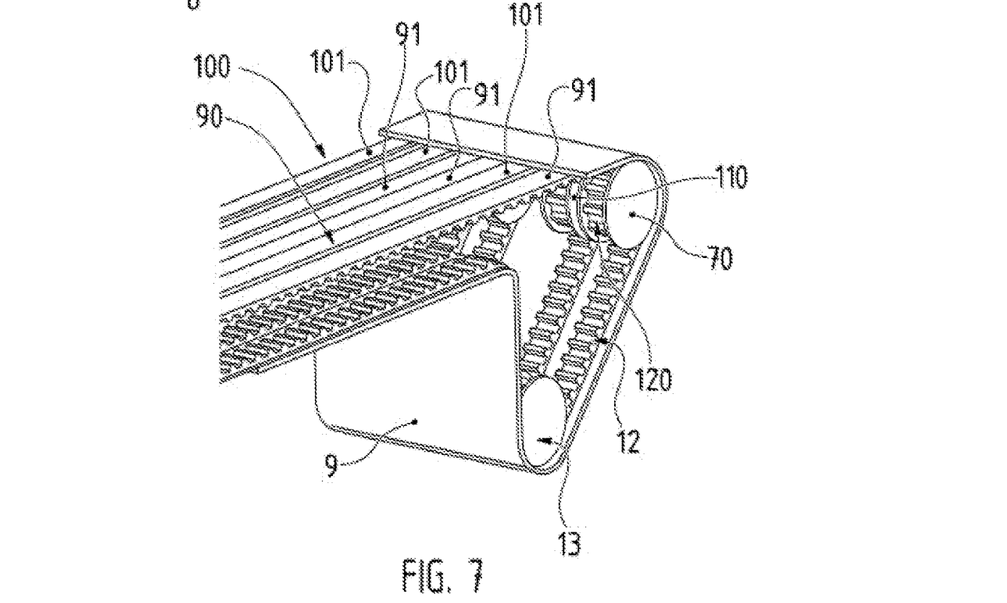
FIG. 7 represents diagrammatically a detail view of FIG. 6, specifically showing the driving of the sections at one end of the conveyor device.

According to another embodiment represented in FIGS. 6 and 7 the drive rollers 7, 11 of the sections 9, 10 may be disposed coaxially, then respectively consisting of at least one drive wheel 70, 110. Each drive roller 7, 11 may consist of a plurality of coaxial drive wheels 70, 110.

Moreover, according to this specific nonlimiting embodiment, there may be multiple drive rollers 7, 1. As can be seen in FIGS. 6 and 7, a first drive roller is situated at a downstream end and a complementary drive roller 13 is offset downwards. This configuration in particular ensures better tensioning of the whole of the belt of the conveyor device 1 whilst improving driving, in particular on acceleration or deceleration of all or part of said belt.

Moreover, in this configuration, as can be seen in FIG. 6, the drive means may include a single return roller 8 situated at the end opposite the drive roller or milers 7, 11. The sections 9, 10 are then wound around the same return miler 8.

Each section 9, 10 is therefore driven by its own drive means at speeds that can be identical or different from one another, offering the possibility of varying the drive speeds of the rollers 7, 11 in order to adapt the speed of each section 9, 10 to specific production requirements and the requirements of the upstream and downstream modules between which the conveyor device 1 according to the invention transports the products 2.

In particular, the length of the conveyor device 1 may be adapted firstly as a function of the possible distance between the loading zone 3 or the upstream module and the downstream module 4 or secondly as a function of the nominal speed of feeding said module 4 and the possible loading throughput relative to the numbers of products 2 at the level of the zone 3 or thirdly as a function of the distance to be covered by each of the facing sections, in particular of said nominal feeding speed. To be more precise, the length of the conveyor device 1 may be determined to obtain sufficient and secured acceleration of a section (i.e. ensuring preservation of the arrangement of the loaded products 2 and avoiding tipping) up to catching up with the other section, as a function of the speeds that it is possible to reach and of the distance to be covered, whilst preserving the continuity of supply.

Said second drive means 100 of said second section 10 may preferably be mounted on and wound around said return roller 7, as can be seen in FIGS. 2 to 5, or around their own return roller, not shown, or around a separate return roller aligned with said return roller 7 (in other words, coaxially therewith across the width of said device 1), Furthermore, each return roller 7 may be freely rotatable to ensure tensioning of the means 90, 100 wound around them and the free movement of their respective section 9, 10. According to the embodiment represented in the figures, the return roller 7 is situated at the opposite end of the conveyor 1 to the downstream module 4.

It will be noted that the sections 9, 10 may share or have their own intermediate rollers, not shown, situated between their drive rollers 7, 11 and the return roller 8. These intermediate rollers support the sections 9, 10 as they pass and their respective winding means 90, 100, maintaining the tension therein.

To be more precise, according to a preferred embodiment, said first drive means 90 and said second drive means 100 may take the form of at least one belt reciprocally engaged with said first drive roller 7 and said second drive roller 11. Driving is then effected by friction around drive rollers 7, 11 or by meshing if the belt has corresponding teeth.

According to the specific embodiment that can be seen in FIG. 7, driving may be effected by meshing around the drive rollers 7, 11. Each belt 91, 101 is then provided with corresponding teeth 12. Moreover, as mentioned above, said first drive roller 7 and said second drive roller 11 may preferably and reciprocally have at least one first drive wheel 70 and at least one second drive wheel 110, the latter then having complementary teeth 120 corresponding to the teeth 12 of the belts 91, 101, ensuring that they mesh.

The belts 91, 101 connected to each section 9, 10 may preferably be at least two in number, in particular three or even four, spaced and parallel and lying in essentially vertical planes extending along the length of the device 1, ensuring the lateral stability of each section 9, 10 that is attached thereto. The belts of the first section 9 can then be disposed on either side of and along the device 1, whereas the belts of the second section 10 are positioned internally, or vice versa, or the respective belts of the sections 9, 10 may be positioned one within the other, one in two or one in three, etc. (i.e. each belt 91 or 101 of a section 9 or 10 reciprocally includes side by side at least one other belt 101 or 91 of another section 9 or 9).

Moreover, each belt 91, 101 is fastened to the inside of its section 9, 10. In other words, each section 9, 10 is fixed to its belt or belts 91, 101 by its face opposite that receiving products 2, i.e. the bottom of each section is fixed to its belt or belts 91, 101.

According to other embodiments, the first winding means 90 and the second winding means 100 may take the form of at least one chain or rack, preferably a plurality thereof. The respective drive rollers 7 and 11 are then complementary in order to ensure the interengagement and the driving thereof.

The configuration of the conveyor device 1 in a plurality of distinct and independent sections 9, 10 then enables the products to be conveyed over its length at different speeds, from the loading zone 3 or an upstream module to the downstream module 4.

Moreover, this single double-section double-speed conveyor 1 enables optimization of the footprint compared to a plurality of different conveyors arranged end-to-end, shortening the production line between the loading zone 3 or the upstream module and the downstream module. In particular, in one specific example the invention results in a more compact conveyor device 1 of this kind between a module feeding products ready to be formed into loads at the upstream end and a load-forming means at the downstream end, which is then fed directly via a plurality of corridors.

The group 5 transferred onto the section 9, 10 preferably has a dimension in the longitudinal direction very close to that of said section. In particular, the transferred group 5 and the position of the section during transfer are such that the distance between firstly the most downstream side of the transferred group 5 and secondly the most downstream side of the section that receives it is small, preferably less than the dimension of a bottle. It is the same for the distance between firstly the most upstream side of the transferred group and secondly the most downstream side of the section that receives it.

It is clear that the section circulates along a curved path at its downstream end so as to effect the return to position. This curvature creates a concavity with the upstream end of the conveyor on which the products then circulate, this end also being curved. A dead plate to fill the concavity formed in this way may be envisaged, relying on the upstream products being pushed by the section that is moving them so that they push those on the dead plate until they reach the next conveyor.

The walls delimiting the corridors preferably extend over the dead plate. Concerning the walls delimiting the corridors, the latter may extend in line with a portion of the path of the sections. It may in particular be imagined that, when it deposits the products on the section, the multiple wall transfer tool terminates its movement in a position in which its walls come to line up with the walls delimiting the corridors of the machine on the downstream side. The products then circulate at all times in corridors defined by successive walls, which eliminates all risk of creating quincunxes.

The invention also concerns a method of conveying products 2 in which said products 2 circulate in an ordered configuration.

A method of this kind consists in conveying said products 2 from the loading zone 3 or an upstream module to the downstream module 4 across the receiving surface 6.

In the embodiment with a loading zone 3, the products 2 are more particularly transferred group by group from this zone 3 to the receiving surface 6 of the conveyor 1, across appropriate means for transferring them, in particular by transverse horizontal plane sliding, from one surface to the other.

Said method is advantageously characterized in that a receiving surface 6 is used that is formed by a first section 9 and a second section 10 driven independently and mobile relative to one another.

Said first section 9 is then stopped at the level of said loading station 3 or of the upstream module and said products 2 are then transferred group by group from said loading zone 3 or said upstream module while said second section 10 is driven at a given speed and offloads the products at the level of said downstream module 4. An example of a step of this kind is represented in FIG. 2.

The stopped or virtually stopped section 9, 10 opposite the loading zone 3 therefore minimizes the risks of modification of the position of the products during their transfer to the receiving surface 6 consisting of this section 9, 10.

Figure 3:
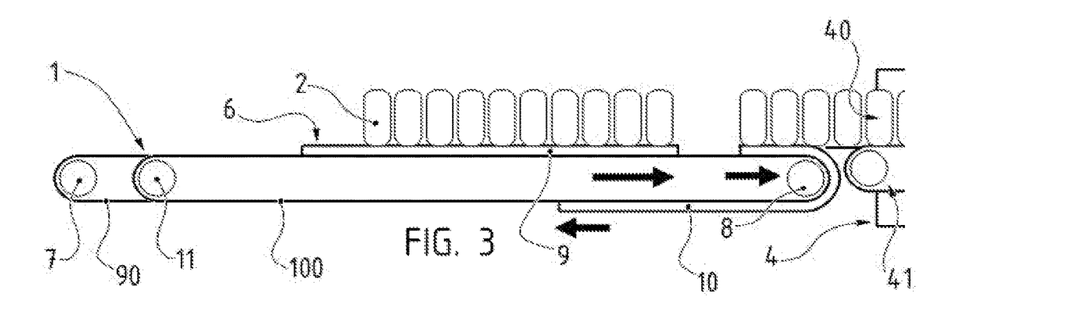
FIGS. 3 to 5 represent diagrammatically side views similar to FIG. 2 of a plurality of successive steps, showing one example of respective movements of the first and second sections.
Figure 4:
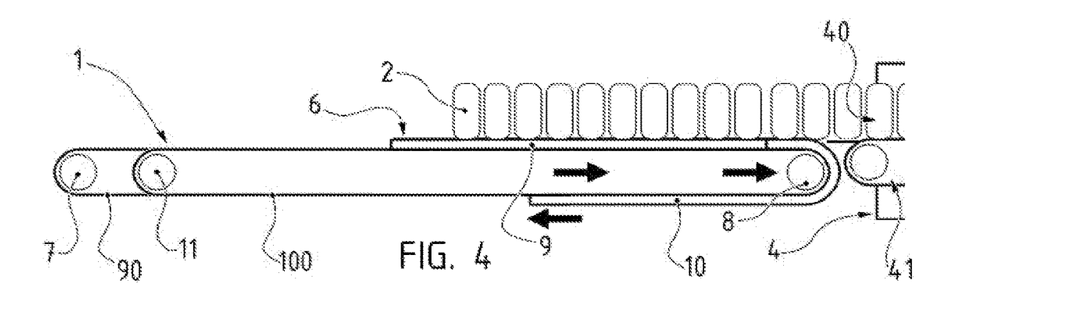

Said first section 9 is then accelerated to a speed greater than said given speed of said second section 10 until the downstream end of said first section 9 comes up against or as close as possible to the upstream end of said second section 10 so as then to form as continuous as possible a conveying surface. An example of these two steps is represented in FIGS. 3 and 4.

It will be noted that the acceleration is calculated as a function of the length of the conveyor 1 and more particularly as a function of the distance to be travelled by the first section to catch up with the second, but also relative to the type of products 2 transported, in order to limit the risks of changes of position during the passage from the stopped position of a section 9, 10 and through intermediate positions until the required driving speed is reached, directly behind the second section.

The speed of the first section 9 is then reduced until it reaches the speed of said section 10, or a slightly higher speed in order to provide the perfect junction between the belts constituting each of said sections 9, 10. In particular, slowing down ensures that the corresponding ends of the belts of the sections 9, 10 come into contact without colliding, which could compromise the preservation of the arrangement of said products 2. This deceleration may be effected at the moment of abutment, before or after the respective ends of the sections 9, 10 come into contact.

The downstream module is therefore fed with products in succession in the longitudinal direction, preferably with a plurality of longitudinal columns from one side to the other. This continuous feeding is obtained by virtue of the fact that the two sections are one behind the other, with no gap between them. The downstream module is therefore fed alternately with products from the first section, then the second and so on. When one of the sections is feeding the downstream machine the other is receiving products and is then accelerated to catch it up so as to deliver products continuously to the downstream machine. The low speed of supply in multiple corridors of the downstream station can then be exploited to catch up to the point of cancelling it out thanks to a higher speed that is created between a section that feeds the downstream module at this low speed and another section that is stopped to receive products transferred group by group from the upstream module.

As previously mentioned, the acceleration and the deceleration are calculated in order to minimize the risks of the products 2 transported by the corresponding section 9, 10 changing position or falling over.

In other words, as can be seen in FIG. 4, the two sections 9 and 10 then have approximately the same speed of forward movement once the following one has caught up with the preceding one.

It is therefore possible to catch up with the second section which is in the process of offloading its products 2, ensuring continuity of the flow supplying said products 2 transported in this way.

In particular, after joining up, slight packing of the products 2 may be effected, minimizing the offset between the lead products 2 fed by the first section 9 and the tail products 2 carried by the second section 10 downstream thereof.

This packing may be produced by having the receiving surface 6 travel at a slightly higher speed than that feeding the downstream module.

Figure 5:
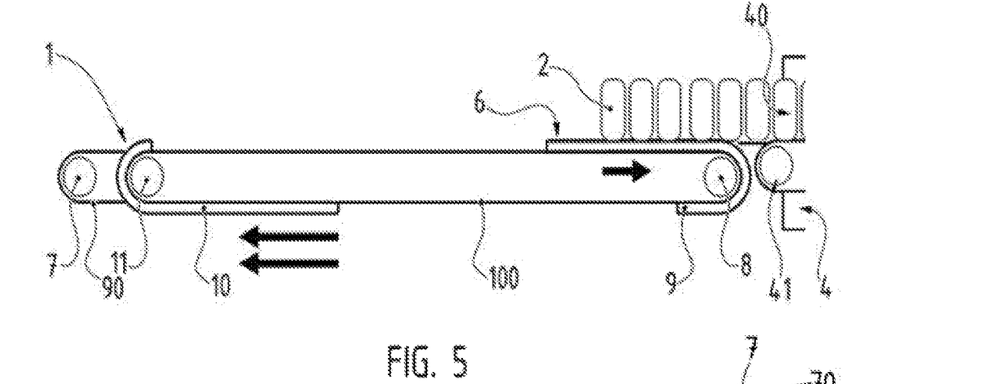

Additionally, after offloading the products 2 at the level of said downstream module 4 by said second section 10, the second section 10 is driven at least along the return run as far as said loading zone 3 or the upstream module. At this time, the second section 10 is empty, carrying no products 2, and, being lower, can therefore be driven fast to return as quickly as possible to the location opposite the loading zone 3 or the upstream module. One example of a step of this kind is represented in FIG. 5.

Said second section 10 is then stopped. This step is as seen in FIG. 2.

To summarize, the sections 9, 10 follow on with a variable spacing, firstly increasing or decreasing when a section located downstream and loaded with products 2 is moved to feed the downstream module 4 while another section is stopped and loading at the level of the zone 3 or of the upstream module or secondly decreasing when the upstream section is moving at a higher speed to rejoin the other section that has slowed down to the nominal speed while it feeds said downstream module 4 or thirdly decreasing on the underneath return of an empty section to the zone 3 while the other section is discharging the products 2 to feed said downstream module 4.

It will be noted that the arrows in FIGS. 2 to 5 represent diagrammatically with no specific value or ratio but merely by way of illustration the speed of movement of each section 9 relative to the other section 10.

Moreover, the abovementioned speeds are variable and determined precisely, as a function of data inherent to the production and/or packaging throughput of the line, for example and non-exhaustively as a function of the products 2 transported, but also of the length of the device 1, of the loading zone 3, or of the throughput required to feed the downstream module 4.

The foregoing steps may then be repeated, ensuring continuous feeding of the downstream module 4, whereas the loading surface 3 delivers groups of products discontinuously.

Moreover, the speeds of the various sections 9, 10 depend on the nominal speed for feeding the downstream module but also on the length between that downstream module and the loading zone 3 or the upstream module. These conveying speeds of sections 9, 10 can also be modified in order to regulate the supply of products as a function of the production cycles, in particular relative to a conveyor equipping a load-forming type downstream module.

By virtue of its conveyor device 1 and its conveying method, the invention enables products 2 to be fed between two locations on a production and/or packaging line whilst ensuring the preservation of an initial configuration with no quincunx, limiting the risks of changes of position. Moreover, it is possible for products to accumulate at the level of the loading zone 3, providing a greater time lapse in order to put them in order if they are not in order already. In any event, this loading zone 3 offers a smaller footprint than other known accumulation zones. In a related manner, any way of feeding this loading zone 3 may be envisaged in order to feed the products 2 and put them in order.

The invention will apply to the conveying of any type of product 2 to feed products to a downstream module 4 having either only one corridor or a plurality of corridors 42.

There is therefore possibly obtained an integral equipment unit comprising a loading zone, of rectangular surface type, possibly mobile continuously along a transverse axis;

a receiving surface moving along this rectangular surface at a first longitudinal end, namely horizontally and perpendicularly to the transverse axis;

conveyor feeding means circulating along the opposite longitudinal end; and a downstream module of load-forming type fed by the receiving surface and therefore in line with it.

The products circulate throughout this equipment unit with no quincunx and they are fed directly into the load-forming device in separate corridors.

As emerges from the foregoing description, the conveyor device 1 includes a receiving surface 6 intended to support products 2. That surface 6 is preferably essentially flat, or even flat, and preferably extends in an essentially horizontal, or even horizontal, plane, as represented in the appended figures. In other words the products 2 are supported by an essentially flat and essentially horizontal surface 6 when conveyed on the conveyor device 1. The receiving surface 6 is therefore able to receive a plurality of products 2 whatever the format of the products 2 to be treated and their arrangement on that surface 6. In fact, the surface 6 does not necessitate the presence of retaining elements like vertical walls or receptacles, also known as buckets.

Apart from the fact of imposing a particular arrangement of the products 2 on the device 1, that type of element has the disadvantage of being specific at least to the dimensions of the products 2 and even to their shape in the case of buckets.

Another disadvantage of these retaining elements lies in the fact that, by virtue of their disposition, they impose the manner in which the products must quit the surface that is supporting them to continue their travel in the line and in particular to go to a downstream module. In fact, by way of example, the presence of transverse vertical walls prevents any frontal exit of the products 2 while the presence of longitudinal buckets can allow such exit of products but only for a longitudinal line of products 2. Such elements also occupy a considerable space within a device.

The surface 6 is therefore preferably devoid of elements intended to retain products 2 of bucket or vertical wall type when conveying them. It is therefore advantageously able to receive products 2 of immaterial shapes and dimensions, those products 2 being ordered or not. By way of example, it is able to support products 2 with a square or triangular base the height of which is vertical or not, these products 2 being placeable randomly on this surface 6 in no particular order.

In such embodiments the receiving surface 6 therefore alone guarantees the positioning and the forward movement of the products 2, exclusively by adhesion.

Moreover, in such embodiments, the conveyor 1 is adapted to deliver the products 2 that it supports in a frontal manner onto a transporter 41, also in principle taking the form of a conveyor, whatever the arrangement of the products 2 on the receiving surface 6. No actuator is therefore necessary for transferring the products 2 onto the transporter 41 that moves the products 2 to the rest of the production and/or packaging line. The products 2 are simply fed to the transporter 41 by virtue of the operation of the conveyor 1. The transporter 41 is then in line with the conveyor 1, its receiving surface being flush with the receiving surface 6. A dead plate between the conveyors 1 and the transporter 41 may be envisaged as represented in FIGS. 2 to 5. In other words, the conveyed products 2 may pass from the conveyor 1 to the transporter 41 longitudinally.

It is to be noted that the transporter 41 may travel at a speed slightly less than that of the section 9, 10 during offloading of the products 2 so as to compact slightly the flow of products 2. In fact, it can happen that, in particular for safety reasons, the downstream and/or upstream end(s) of the section 9, 10 do not support products 2. In fact, it is generally preferable to dispose at least one product 2 on the receiving surface 6 rather than causing that product 2 to fall over because for example it is not resting completely on said surface 6.

The device 1 therefore not only enables continuous conveying of the products 2 independently of their format and of their arrangement on the surface 6 but also enables those products 2 to be fed to the rest of the line in a simple manner.

To be more precise, each independent section 9, 10 of the surface 6 is an essentially flat, or even flat, continuous surface that preferably lies in an essentially horizontal, or even horizontal, plane.

This continuous surface is a surface able to support products 2 over the whole of its extent. A plate therefore includes a continuous upper surface, but a perforated plate may also have such a surface if the holes are small enough not to compromise the support of the products 2.

For its part the receiving surface 6 may be alternately continuous and discontinuous as a function of the current step of the conveying method. Thus when the first section 9 is being loaded the section 10 is being offloaded and the two sections are spaced from one another. The same applies during loading of the second section 10. On the other hand, once the first section 9 is loaded, it accelerates to rejoin the second section 10 and then together to form a continuous receiving surface 6, i.e. the sections 9 and 10 are flush and with no gap between these two sections. The same applies when the second section 10 is loaded and its downstream end has rejoined the first section 9 at its upstream end.

It is to be noted that during the transfer of the products 2 on one of the sections 9, 10, in particular from a loading zone 3, all of the products 2 to be positioned on one or other of the sections 9, 10 is preferably transferred while that section 9, 10 is stationary. The section 9, 10 to be loaded is therefore stopped, all of the products 2 to be positioned on top of it are transferred, in particular by pushing them transversely, and the loaded section 9, 10 then begins to circulate again. The loading step then in no way necessitates a succession of a plurality of stop-go phases with progressive transfer of the products 2 during each period in which the section 9, 10 is stationary. This results in improved throughput.

According to preferred embodiments of the invention, the receiving surface 6 is then essentially flat, lies in an essentially horizontal plane, and includes at least one continuous first section 9 and one continuous second section 10 each able to support a plurality of products 2 whatever the arrangement of those products 2.

Because of its essentially flat and essentially horizontal receiving surface 6, the device 1 is therefore able to move a set of products 2 that may be disposed freely, that is to say either in bulk or in one or more lines, for example longitudinal lines, that is to say which extend in the conveying direction of the device 1. The products 2 are preferably arranged in a plurality of longitudinal lines parallel to one another, that is to say in a matrix with no quincunx.

Because of its essentially flat and essentially horizontal receiving surface 6, the device 1 is moreover capable of receiving products 2 by means of a pushing movement, in particular from a loading zone 3.

As emerges from the foregoing description, and as represented in FIGS. 1 and 8 to 10, another aspect of the invention concerns an installation comprising at least:

a loading zone 3 as described above, and
a conveyor device 1 as described above.

The loading zone 3 advantageously serves as an accumulation surface, that is to say a buffer surface receiving products 2 in transit between two successive machines of a production and/or packaging line of said products 2. An accumulation surface of this kind enables management of the flow of products 2 that circulate in particular between two machines and to adapt that flow as a function of the respective throughputs and temporary stoppings of those machines so as to optimize the throughput of the line.

The loading zone 3 is in principle juxtaposed to one of the longitudinal sides of the device 1 and is flush with the receiving surface 6 so that the products 2 can be transferred from the loading zone 3 to the receiving surface 6 by simply pushing them laterally in the transverse and essentially horizontal direction. Such transfer advantageously preserves a longitudinal alignment of the products 2.

The loading zone 3 is preferably essentially flat, or even flat, and preferably lies in an essentially horizontal, or even horizontal, plane. In principle it extends from an upstream end to a downstream end, the downstream end being butted up against the receiving surface 6. The products 2 supported by this surface 3 move toward the downstream end, that is to say in particular transversely, or even essentially perpendicularly to the direction in which the conveyor device 1 extends.

According to one possible additional feature, the installation further includes transfer means for transferring the products 2 from the loading zone 3 to the receiving surface 6.

Figure 8:
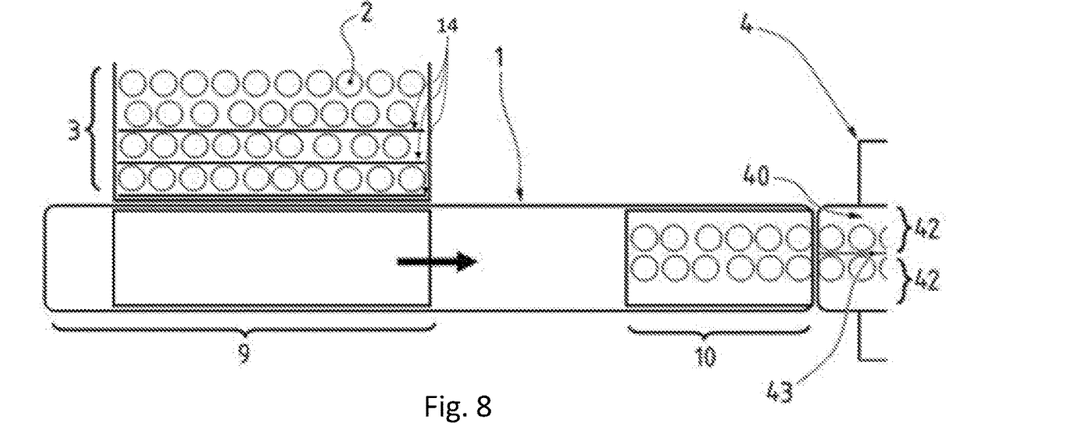
FIGS. 8 to 10 represent diagrammatically a view from above of one embodiment of the invention in a production line, more particularly showing a plurality of successive steps of conveying products from a loading zone to a downstream module.
Figure 9:
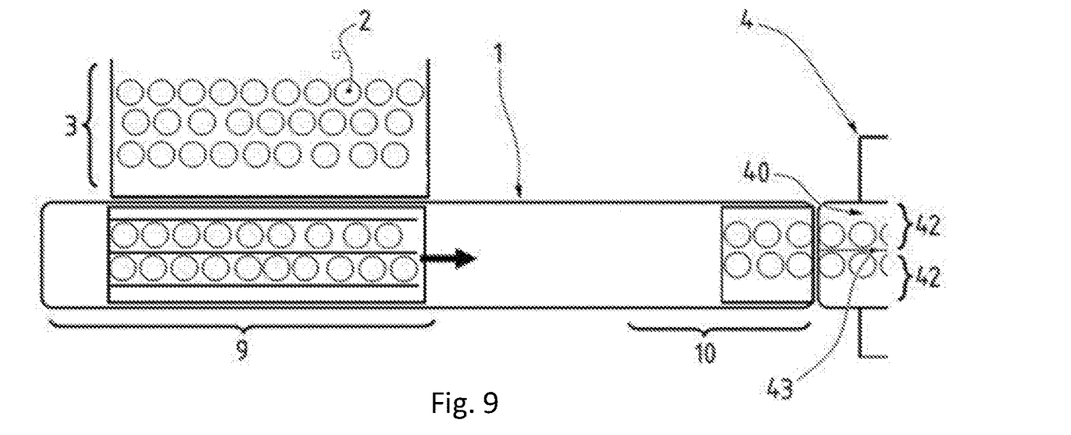
Figure 10:
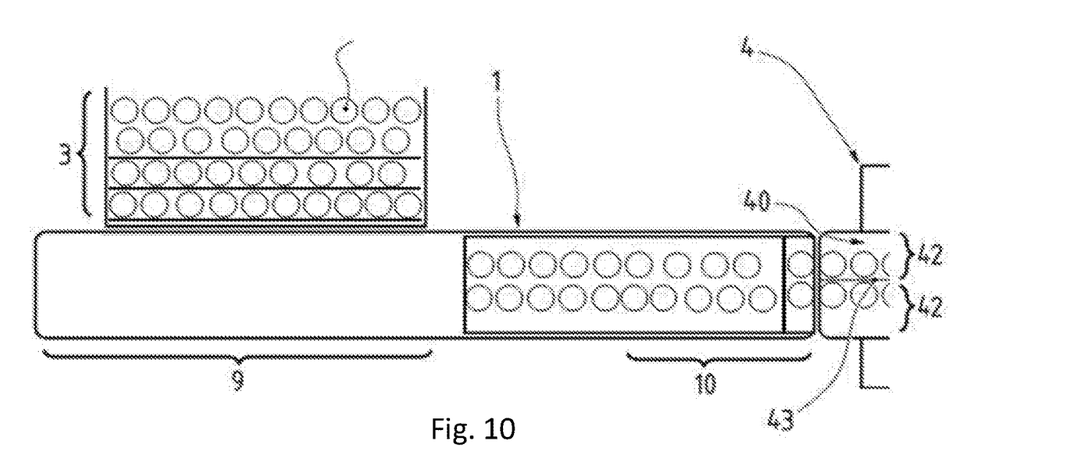

Such transfer means may in particular take the form of pushing means intended to push one or more longitudinal segments of products 2 by sweeping them transversely and essentially horizontally. In particular a pushing means intended to transfer a plurality of longitudinal segments of products 2 simultaneously may be adapted to maintain those segments separate during sweeping so as to preserve the arrangement thereof in a plurality of segments, i.e. with no quincunx. As indicated above and as represented in FIGS. 8 to 10, it may therefore include one or more pusher plates 14, the number of plates 14 being correlated with the number of longitudinal segments that the group 5 to be transferred contains. By way of example, the pushing means may include as many plates 14 as there are longitudinal lines constituting the group 5 to be transferred. The pushing means alternatively and preferably includes at least n+1 plates 14 when it is a question of transferring groups 5 of n longitudinal segments so that during transfer each segment is located between two plates 14. The spacing between the plates 14 may be adjustable so as to be able easily to process diverse product formats without generating additional tooling. It is to be noted that not all the plates 14 are necessarily used during a transfer. For example, the same transfer means may therefore be used to circulate products 2 both in three longitudinal lines and in five longitudinal lines at the level of the conveyor 1, therefore enabling the use of the same transfer means without making adjustments for different configurations at the level of the conveyor 1. To put it simply, in this case two pusher plates 14 would not be used during a simultaneous transfer of three lines.

According to one possible additional feature, the installation further includes conveyor feeding means intended to feed the loading zone. Feeding means of this kind extend in particular from the exit of an upstream module, of labelling or capping type for example, as far as the level of the loading zone 3 and the level of its upstream side. The products 2 in principle circulate in one or more files on this supply means, preferably in a single file.

At least one portion, in particular the downstream portion, of such feeding means preferably extends longitudinally along the upstream side of the loading zone 3. The upper surface of the feeding means that supports the products 2 is in principle essentially flat, or even flat, and preferably lies in an essentially horizontal, or even horizontal, plane. The upper surface of the portion of the feeding means that runs along the feeding surface is preferably flush with that surface and abutted to the latter, that is to say there is no gap between the two surfaces.

The products 2 can therefore be transferred from the feeding conveyor to the loading zone 3 with the aid of a transfer means of the same type as that described above and intended to transfer the products 2 from the loading zone 3 onto the receiving surface 6. The transfer means used to transfer the products 2 from the loading zone 3 onto the receiving surface 6 may for example also be used for the transfer of the products onto the loading zone 3.

The transfer means intended to transfer the products 2 from the loading zone 3 onto the receiving surface 6 is advantageously also a pushing means as described above so as to preserve the longitudinal alignment of the products 2.

According to one possible additional feature, the installation further includes the downstream module 4.

The installation advantageously enables the products 2 to be conveyed from an upstream module of capping or labelling type for example to a downstream module 4 of load-forming or boxing type for example, exploiting a loading zone 3 or an accumulation surface to arrange the products 2 in one or more parallel lines and exploiting the conveyor device 1 to enable continuous feeding of the downstream module 4 by a plurality of continuous corridors, that is to say without generating any additional gap between the consecutive products.

In some embodiments the installation therefore enables a single-file flow of products 2 to be transformed into a multi-file flow arranged as a plurality of parallel columns, the number of columns being determined as a function of the configuration of the batches that it is wished to form in the downstream module 4 and as a function of the capacity of the transfer means.

It is to be noted that the flow of products 2 at the entry and at the exit of an installation of this kind is continuous although the transfers of the products 2 in order to enter and exit the loading zone 3 are effected sequentially. These transfers enable both the transformation of a single-file flow into a multi-file flow and also accumulation of the products 2.

An installation of this kind is therefore distinguished from a conventional installation in particular in that the loading zone 3 and the conveyor 1 advantageously replace the succession between the upstream module 3 and the downstream module 4 of a degrouping means (enabling the change from a single-file flow to a wider bulk flow) and a surface for accumulation of bulk products, followed by a device for putting the products into corridors.

In fact the known succession of degrouping and accumulation means is particularly costly, has a large footprint (because of the necessity for a whole series of successive conveyors), generates product jams at the level of forming them into corridors and is not compatible with a wide range of product dimensions.

On the other hand, the proposed installation is compact, economical, multi-format and enables fluid circulation of the products 2.

As illustrated in FIGS. 8 to 10 the products 2 may be arranged in the form of longitudinal segments side by side in the transverse direction and transferred as such onto the receiving surface 6.

To this end, the transfer means used includes one or more pusher plates 14 to transfer, by an essentially horizontal transverse sweeping movement, the required number of lines of products 2 onto the first section 9 of the receiving surface 6 which is at this time stationary. For example, the transfer means represented in FIGS. 8 to 10 comprises three longitudinal plates 14 so as to transfer two segments of products 2 simultaneously. Generally speaking, the transferred groups 5 comprise the same number of lines as the batches to be formed in the downstream module 4.

FIG. 8 therefore represents an installation in which the transfer means is positioned to transfer a group 5 of products 2 onto the first section 9 of the receiving surface 6 while the second section 10 is in the process of offloading a group 5 of products 2 at the level of the downstream module 4 downstream of and in line with the device 1.

FIG. 9 diagrammatically represents the situation once the group 5 has been transferred onto the first section 9. The transfer means is still at the level of the group 5, ready to be retracted. The first section 9 is still stationary and the second section 10 continues to offload products 2 at the level of the downstream module 4. It is also seen that the products 2 remaining in the loading zone 3 have advanced transversely toward the downstream side of the loading zone. This movement may in particular be effected by virtue of the fact that the loading zone constitutes the upper surface of a conveyor means that circulates transversely.

The transfer means is then retracted and positioned in order to transfer a new group 5 of products 2 onto the receiving surface 6, to be more precise onto the second section 10 of that surface 6.

FIG. 10 therefore represents the situation in which the transfer means is in the process of being positioned to transfer a group 5 of products to the second section 10. In this figure, the second section 10 is not yet at the level of the loading surface 3, and the transfer can therefore not yet take place. The second section 10 finishes the offloading of the products 2 at the level of the downstream module 4. Once offloading has finished, the second section can accelerate to be positioned at the level of the loading zone 3 for the transfer. As for the first section 9, it has rejoined the second section 10, the receiving surface 6 then forming a continuous surface. Of course, an installation in which the sections 9 and 10 are not abutted but slightly spaced at this stage of the process would be equally suitable, all the more so if the downstream module functions in a sequential manner, like a palletizer for example, rather than a continuous manner.

Of course, it is understood that the invention is not limited to the embodiments described above and that the features described above or even only parts thereof may be combined.

The invention claimed is:

1. A conveyor device (1), including a surface (6) to receive products (2) extending at least in part longitudinally along a closed loop path, wherein:
    said receiving surface (6) includes at least one first section (9) and one second section (10) that are independent in line longitudinally with one another in their direction of forward movement;
    said first section (9) extending over a first part of the length of said surface (6), driven via first drive means;
    said second section (10) extending over a second part of the length of said surface (6) distinct from said first part, driven via second drive means,
    each section (9, 10) being constituted by a longitudinally continuous mat.

2. The conveyor device (1) as claimed in claim 1, wherein said first drive means take the form of at least one first drive roller (7) and at least one return roller (8), said first section (9) including first winding means at the level of a first end at least around said first drive roller (7) and at the level of a second end at least around said return roller (8).

3. The conveyor device (1) as claimed in claim 2, wherein said second drive means include at least one second drive roller (11), said second section including second winding means at the level of one of its ends at least around said second drive roller (11).

4. The conveyor device (1) as claimed in claim 3, wherein said second winding means of said second section are mounted on and wound around said return roller (8) of the first drive means.

5. The conveyor device as claimed in claim 4, wherein said first and second winding means take the form of at least one belt reciprocally engaged with said first drive roller (7) and said second drive roller (11), each belt being fastened to the inside of a respective one of the sections (9,10).

6. The conveyor device as claimed in claim 3, wherein said first and second winding means take the form of at least one belt reciprocally engaged with said first drive roller (7) and said second drive roller (11), each belt being fastened to the inside of a respective one of the sections (9,10).

7. The conveyor device (1) as claimed in claim 1, wherein said second drive means include at least one second drive roller (11), said second section including second winding means at the level of one of its ends at least around said second drive roller (11).

8. A method of conveying products (2) in which said products (2) are arranged in an ordered position, comprising:
    conveying said products (2) from a loading zone (3) or an upstream module to a downstream module (4) across a receiving surface (6);
    wherein:
    the receiving surface (6) includes a first section (9) and a second section (10) driven independently;
    said first section (9) is stopped at the level of said loading zone (3) or of the upstream module and said products (2) are transferred from said loading zone (3) or said upstream module whilst said second section (10) is driven at a given speed and offloads the products (2) at the level of said downstream module (4);
    said first section (9) is accelerated to a speed higher than said given speed of said second section (10) until the downstream end of said first section (9) reaches the upstream end of said second section (10),
    said transfer being a transverse transfer of a group (5) of products, from said loading zone (3) to one of said sections (9,10), said group (5) having at least one or at least two longitudinal segments each comprising several products.

9. The conveying method as claimed in claim 8, wherein said first section (9) is decelerated to said speed of said second section (10) when said first section (9) is positioned adjacent said second section (10).

10. The conveying method as claimed in claim 9 further comprising a step of feeding the downstream module (4) by the continuous and successive arrival of the sections (9, 10).

11. The conveying method as claimed in claim 8 further comprising a step of feeding the downstream module (4) by the continuous and successive arrival of the sections (9, 10).

12. The conveying method as claimed claim 8, wherein, after the products (2) are offloaded at the level of said downstream module (4) by said second section (10), the second section (10) is driven along the return as far as said loading zone (3) or the upstream module and said second section (10) is stopped.

13. The conveying method as claimed in claim 8 further comprising includes where applicable causing the products to circulate in separate longitudinal corridors delimited by walls following their transfer to one of the sections (9, 10).

* * * * *